(12) United States Patent
Kuang et al.

(10) Patent No.: US 11,928,840 B2
(45) Date of Patent: Mar. 12, 2024

(54) METHODS FOR ANALYSIS OF AN IMAGE AND A METHOD FOR GENERATING A DATASET OF IMAGES FOR TRAINING A MACHINE-LEARNED MODEL

(71) Applicant: Meta Platforms, Inc., Menlo Park, CA (US)

(72) Inventors: Yubin Kuang, Lund (SE); Pau Gargallo Piracés, Barcelona (ES); Manuel Antonio López Antequera, Malaga (ES); Roger Marí Molas, Barcelona (ES); Jan Erik Solem, Bjärred (SE)

(73) Assignee: Meta Platforms, Inc., Menlo Park, CA (US)

( * ) Notice: Subject to any disclaimer, the term of this patent is extended or adjusted under 35 U.S.C. 154(b) by 352 days.

(21) Appl. No.: 17/439,355

(22) PCT Filed: Mar. 13, 2020

(86) PCT No.: PCT/EP2020/056771
§ 371 (c)(1),
(2) Date: Sep. 14, 2021

(87) PCT Pub. No.: WO2020/187723
PCT Pub. Date: Sep. 24, 2020

(65) Prior Publication Data
US 2022/0198710 A1    Jun. 23, 2022

(30) Foreign Application Priority Data
Mar. 15, 2019   (SE) .................................... 1950327-5

(51) Int. Cl.
*G06T 7/80* (2017.01)
*G06T 5/00* (2006.01)

(52) U.S. Cl.
CPC ................ *G06T 7/80* (2017.01); *G06T 5/006* (2013.01); *G06T 2207/20081* (2013.01); *G06T 2207/20084* (2013.01)

(58) Field of Classification Search
CPC . G06T 7/80; G06T 5/006; G06T 2207/20081; G06T 2207/20084
See application file for complete search history.

(56) References Cited

U.S. PATENT DOCUMENTS

2019/0164312 A1* 5/2019 Sunkavalli ............... G06N 3/08
2020/0043197 A1* 2/2020 Bazin ..................... G06N 20/20

FOREIGN PATENT DOCUMENTS

WO    2019045721    3/2019

OTHER PUBLICATIONS

International Search Report and Written Opinion for International Application No. PCT/EP2020/056771, dated Jul. 1, 2020, 16 pages.
(Continued)

*Primary Examiner* — David F Dunphy
(74) *Attorney, Agent, or Firm* — Greenberg Traurig, LLP

(57) ABSTRACT

A method for analysis of an image comprises: receiving (402) the image to be analyzed; processing (404) the image with a machine-learned model, wherein the machine-learned model is configured to predict at least an intrinsic parameter of the image using at least a first variable of the machine-learned model, wherein the first variable defines a relation between a radial distortion of the image and a focal length of the image; and outputting (406) the intrinsic parameter of the image. Also, methods for forming a 3D reconstruction of a scenery, for training a machine-learned model for analysis of an image and for generating a dataset of images for training a machine-learned model are disclosed.

20 Claims, 4 Drawing Sheets

(56) References Cited

OTHER PUBLICATIONS

Melo R., et al., "Unsupervised Intrinsic Calibration from a Single Frame Using a "Plumb-Line" Approach," IEEE International Conference on Computer Vision (ICCV), Dec. 1, 2013, pp. 537-544.
Wu Z., et al., "Keeping a Pan-Tilt-Zoom Camera Calibrated," IEEE Transactions on Pattern Analysis and Machine Intelligence, Aug. 1, 2013, vol. 35, No. 8, pp. 1994-2007.

* cited by examiner

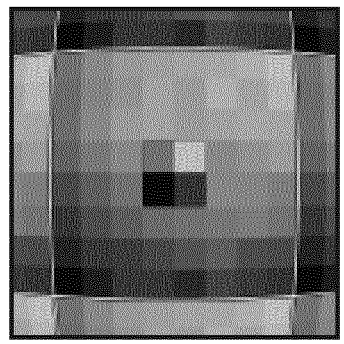 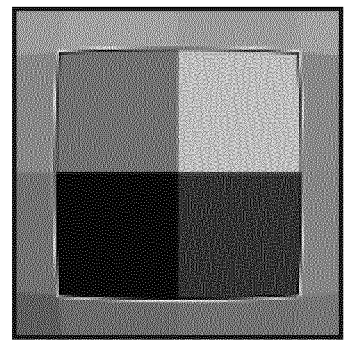
$f = 0.8, k_1 = -0.13$    $f = 3.2, k_1 = -2.05$
Fig. 3a    Fig. 3b
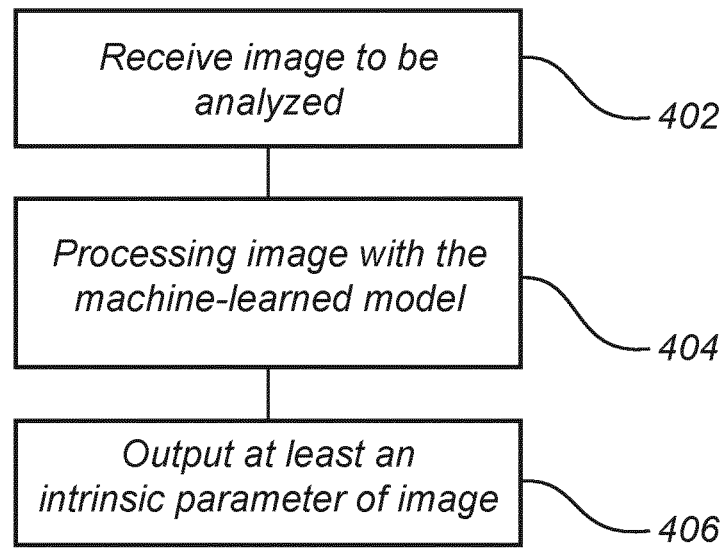
Fig. 4

METHODS FOR ANALYSIS OF AN IMAGE AND A METHOD FOR GENERATING A DATASET OF IMAGES FOR TRAINING A MACHINE-LEARNED MODEL

CROSS REFERENCE TO OTHER APPLICATIONS

This application claims priority to International (PCT) Application No. PCT/EP20/056771, entitled METHODS FOR ANALYSIS OF AN IMAGE AND A METHOD FOR GENERATING A DATASET OF IMAGES FOR TRAINING A MACHINE-LEARNED MODEL filed Mar. 13, 2020 which is incorporated herein by reference for all purposes, which claims priority to Sweden Patent Application No. 1950327-5, entitled METHODS FOR ANALYSIS OF AN IMAGE AND A METHOD FOR GENERATING A DATASET OF IMAGES FOR TRAINING A MACHINE-LEARNED MODEL filed Mar. 15, 2019 which is incorporated herein by reference for all purposes.

TECHNICAL FIELD

The present inventive concept relates to a method for analysis of an image. In particular, the present inventive concepts relate to a method for determining at least an intrinsic parameter of an image. The present inventive concept also relates to training a machine-learned model for analysis of an image, three-dimensional (3D) reconstruction of a scenery based on images for which intrinsic and/or extrinsic parameters are extracted using a machine-learned model, and generating a dataset of images for training a machine-learned model.

BACKGROUND

In many computer vision tasks, such as 3D reconstruction of a scenery, e.g. Structure from Motion (SfM), camera calibration needs to be performed. The camera calibration may facilitate combining different images, as the relations between images may be better represented with help of the camera calibration.

Camera calibration is particularly important when conditions for acquiring images are not controlled, such as when images are acquired through crowdsourcing.

The process of forming an image by a camera is well-known. Thus, very precise calibration of a camera may be performed using sufficient amount of geometric constraints to fit a camera model. However, such calibration typically requires a large set of images which are acquired in laboratory conditions. Thus, such calibration is tedious and not feasible to implement in crowdsourced collection of images.

In a database of images formed by crowdsourced collection, a particular camera may have been used for acquiring only a single image. Thus, there may only be a single image, depicting an uncontrolled environment, to rely on for determining parameters representing image formation by the camera. Similarly, if there is no visual overlap in images, only the information from a single image may be available as basis for a calibration.

Thus, it would be desired to enable determination of parameters representing image formation solely based on a single image. In particular, the parameters may then be used for improving computer vision tasks for a database of images collected through crowdsourcing.

Image acquisition may be represented by extrinsic parameters (i.e. external properties used in acquiring the image, such as tilt or roll of the camera) and intrinsic parameters (i.e. internal properties of the cameras, such as focal length and radial distortion).

SUMMARY

An objective of the present inventive concept is to provide robust determination of parameter(s) representing image formation. It is a particular objective to allow such determination based on a single image.

These and other objectives of the present inventive concept are at least partly met by the invention as defined in the independent claims. Preferred embodiments are set out in the dependent claims.

According to a first aspect, there is provided a method for analysis of an image, said method comprising: receiving the image to be analyzed; processing the image with a machine-learned model, wherein the machine-learned model is configured to predict at least an intrinsic parameter of the image using at least a first variable of the machine-learned model, wherein the first variable defines a relation between a radial distortion of the image and a focal length of the image; and outputting the intrinsic parameter of the image.

It is difficult to determine extrinsic and/or intrinsic parameters of an image based solely on the image as such. At least some parameters may have similar effect on the image that is captured, such that, without more information, it may be difficult to distinguish between different sets of parameters.

For instance, first values of the focal length and a radial distortion parameter may provide a similar effect on an image as second values of the focal length and the radial distortion parameter. Hence, it may be very difficult from the single image to identify whether the first values or the second values provide a correct description of the image.

It is an insight of the present inventive concept that using a variable that defines a relation between a radial distortion of the image and a focal length of the image, the machine-learned model may be trained on a combined effect of the relation between the radial distortion and the focal length. It is found that a machine-learned model for extracting parameters from an image is more easily learned based on using the first variable.

Hence, thanks to the use of the first variable in the machine-learned model, the machine-learned model is robust in correctly determining at least an intrinsic parameter of the image.

The predicted intrinsic parameter may correspond to the first variable of the machine-learned model. Hence, the first variable defining a relation between the radial distortion and the focal length may be predicted and outputted from an analysis of the image. However, it should be realized that the predicted intrinsic parameter may be determined based on further processing, once the first variable has been determined. For instance, the radial distortion of the image and/or the focal length of the image may be predicted after the first variable has been determined, such that the radial distortion of the image and/or the focal length of the image may be independently outputted from the analysis of the image.

It should be realized that the first variable may define a relation, wherein the radial distortion is expressed as a function of focal length and a set of one or more other parameters. Thus, the first variable need not necessarily be based solely on the radial distortion and the focal length, but may also include one or more other parameters of the image, such as an optical center of the image, an aspect ratio of the image or a skew of the image.

It should also be realized that the machine-learned model may be configured to use a plurality of independent variables. Thus, the first variable may be one of two or more variables of the machine-learned model. This also implies that the analysis of the image may enable prediction of a plurality of parameters (intrinsic and/or extrinsic) of the image, such that further information deduced from the analysis of the image may be outputted.

As used herein, parameters are discussed as being "parameters of an image". For instance, "an intrinsic parameter of the image" and "a focal length of the image" are discussed. These terms should be construed as corresponding to a condition in acquisition of an image that is manifested in the resulting image and, as such, form parameters of the image. For instance, an optical system of a camera used for acquiring an image may define a focal length. This focal length used in acquisition of an image has an impact on the image that is acquired and is therefore referred to herein as a focal length of the image.

Radial distortion relates to a deviation, wherein a straight line in a scenery does not remain straight in the image. The radial distortion may form a representation of such a deviation. It should also be realized that the radial distortion of an image may be modeled in different ways.

For instance, the Brown-Conrady model which models radial distortion and tangential distortion caused by physical elements in a lens not being perfectly aligned may be used. In the Brown-Conrady model (where high-order radial distortion terms and tangential distortion terms are ignored), two radial distortion parameters may be used. The Brown-Conrady model is further described in Brown, "Decentering distortion of lenses", Photogrammetric Engineering, vol. 32, no. 3, pages 444-462, 1966, based on the work in Conrady, "Decentered Lens Systems", Monthly Notices of the Royal Astronomical Society, vol. 79, pages 384-390, 1919.

However, it should be realized that other models (as approximation) for radial distortion may be used, such as a one-parameter model by Fitzgibbon, A. W. (2001), "Simultaneous linear estimation of multiple view geometry and lens distortion", In Proceedings of the 2001 IEEE Computer Society Conference on Computer Vision and Pattern Recognition, Vol. 1, pp. I-I).

According to an embodiment, the relation defined by the first variable is proportional to the radial distortion and inversely proportional to a square of the focal length.

It is an insight that using a relation that is proportional to the radial distortion and inversely proportional to the square of the focal length, an effect of radial distortion in the image may be represented independently from the focal length. Thus, the processing of the image with the machine-learned model may provide robust and quick determination of the first variable.

It should be realized that the relation being proportional to the radial distortion and inversely proportional to a square of the focal length defines the relation of the radial distortion and the focal length to each other. Hence, the first variable may use an inverse of the relation, i.e. 1/relation, which may imply that the first variable in itself may be inversely proportional to the radial distortion and proportional to the square of the focal length, whereas the relation defined by the first variable should still be considered to be proportional to the radial distortion and inversely proportional to the square of the focal length.

The processing of the image with the machine-learned model may further separately predict the focal length, such that the radial distortion of the image may then be recovered based on the first variable and the focal length. Hence, even though the first variable may be used to provide a robust output from the machine-learned model, it is still possible to separately determine radial distortion and focal length of the image.

According to an embodiment, the first variable is defined as:

$$\hat{k}_1 = \frac{k_1}{f^2},$$

wherein $\hat{k}_1$ is the first variable, $k_1$ is a radial distortion parameter of the image and f is the focal length of the image.

Use of the relation of the first variable $\hat{k}_1$ may be particularly suitable for robustly predicting the at least one intrinsic parameter of the image. However, it should be realized that the relation of the first variable $\hat{k}_1$ may be at least slightly changed while still enabling at least one intrinsic parameter to be robustly predicted. For instance, addition or multiplication with a factor may be used without departing from the possibility to robustly predict the at least one intrinsic parameter.

Use of the relation of the first variable $\hat{k}_1$ may be particularly suitable for predicting a radial distortion parameter of the Brown-Conrady model and it should be realized that a different relation between the radial distortion and the focal length may be used if another radial distortion model is used.

According to an embodiment, the machine-learned model is configured to use a pre-set relation between a first radial distortion parameter and a second radial distortion parameter.

It is an insight that a relation between the first and the second radial distortion parameter may be defined by a fixed model. Thus, the first and the second radial distortion parameters are not independent variables, which may be used in simplifying the machine-learned model.

The first and the second radial distortion parameters may define radial distortion of the image according to the Brown-Conrady model.

The pre-set relation of the first and the second radial distortion parameters may be fitted to a distribution of variations of the first and the second radial distortion parameters amongst a set of images. For instance, the distribution may be based on observed values of the first and the second radial distortion parameters within a database of images. By fitting the pre-set relation to the distribution of variations, the first and the second radial distortion parameters may be used as dependent variables so as to simplify the machine-learned model.

The pre-set relation may define a variance within the relation, e.g. so as to predict the relation between the first and the second radial distortion parameters to have a set confidence value that the relation is within a given interval.

According to an embodiment, the pre-set relation may define the second radial distortion parameter as a second degree polynomial of the first radial distortion parameter. It is found that a second degree polynomial may provide a good fit to observed relations between the first and the second radial distortion parameters.

It should also be realized that the pre-set relation between the first and the second radial distortion parameter may vary for different types of projection models. Thus, different relations may be used for conventional lenses and for fisheye lenses.

According to an embodiment, the machine-learned model is further configured to predict an uncertainty of the intrinsic parameter and the method further comprises outputting the uncertainty.

Thus, the analysis of the image may determine an uncertainty with which the intrinsic parameter is predicted. The uncertainty may be very useful in further processing of the image in conjunction with other images, such as in 3D reconstruction of a scenery. By providing the uncertainty, use of the intrinsic parameter of the image may be weighted in further processing of the image, such that a proper weight is given to the intrinsic parameter in relation to e.g. intrinsic parameters of other images used in the processing.

This may enable robust use of information extracted from the image in further processing of the image.

According to an embodiment, the machine-learned model being configured to predict at least an intrinsic parameter of the image comprises the machine-learned model being configured to predict a field of view of the image.

The processing of the image with the machine-learned model may enable prediction of a plurality of parameters of the image. It may be of particular interest to predict the field of view of the image, as the field of view may be independent from the first variable. Further, the field of view of the image may be related to the focal length of the image, such that prediction of the field of view of the image may enable determining a prediction of the focal length. Also, by predicting the focal length, the radial distortion of the image may then be recovered from the first variable.

According to an embodiment, the machine-learned model is further configured to predict at least an extrinsic parameter of a camera using which the received image has been acquired.

Thus, the processing of the image with the machine-learned model may also enable prediction of extrinsic parameters of the image. The extrinsic parameters may be useful in relating the image to the scenery and may also be used in further processing of the image, e.g. when the image is to be used in conjunction with other images, such as in 3D reconstruction of the scenery.

The at least an extrinsic parameter may for instance be a roll of a camera and/or a tilt of a camera when the image was acquired.

According to an embodiment, the method further comprises correcting coordinates of feature points in the image based on the outputted intrinsic parameter.

The correcting of coordinates of feature points in the image may also be based on further intrinsic and/or extrinsic parameters predicted in the analysis of the image.

By correcting coordinates of feature points, the feature points may be correctly represented in relation to the image. This may be useful when the image is to be used in conjunction with other images depicting partly overlapping parts of the scenery. The feature points may be used for combining information in the images and by correcting the coordinates of the feature points of the image, the corrected coordinates may be directly used when image information is processed.

When images are processed to extract information of a scenery based on a plurality of images, it may be sufficient to process feature points in the images. Thus, it may be sufficient to correct the coordinates of the feature points in order to allow using image information in the image in image processing to e.g. form a representation of the scenery. Therefore, correcting the coordinates of feature points may provide a resource efficient processing of the image, while enabling image information to be utilized.

According to an embodiment, the method further comprises performing image correction based on the outputted intrinsic parameter.

In some embodiments, it may be advantageous to correct the image based on the intrinsic parameter. The correcting of the image may also be based on further intrinsic and/or extrinsic parameters predicted in the analysis of the image.

Thus, a corrected image may be provided, which may ensure that e.g. distortions in the image may be removed or reduced based on the determined parameters. This may be particularly useful when the image is to be presented to a user, e.g. by outputting the corrected image on a display.

According to a second aspect, there is provided a method for forming a 3D reconstruction of a scenery and camera poses comprising, for each of a plurality of images, processing the image using a machine-learned model for extracting at least one intrinsic or extrinsic parameter of the image, and constructing a model of the scenery based on the plurality of images, wherein the at least one intrinsic or extrinsic parameter of each image is used as input in constructing the model.

Effects and features of this second aspect are largely analogous to those described above in connection with the first aspect. Embodiments mentioned in relation to the first aspect are largely compatible with the second aspect.

In 3D reconstruction, intrinsic and/or extrinsic parameters of images provides useful information for ensuring that an accurate 3D reconstruction is formed. For instance, SfM is sensitive to initial calibration parameters of images, which implies that use of accurate intrinsic and/or extrinsic parameters of images will highly affect accuracy of the SfM.

The intrinsic and/or extrinsic parameters of an image may be provided as metadata by a camera that acquired the image. For instance, the camera may be calibrated in a laboratory to determine intrinsic parameters, which may then be appended by the camera as metadata of the image. However, thanks to the processing of images using the machine-learned model, images for which no (or unreliable) metadata of intrinsic and/or extrinsic parameters is available may still be reliably used in 3D reconstruction.

The analysis of the image using the machine-learned model may allow the at least one intrinsic or extrinsic parameter to be predicted based solely on the image itself. Hence, the parameters may be predicted independently and need not use information that is available in other of the plurality of images.

The analysis of the images and the constructing of the model may be performed in completely separate steps. For instance, images may be analyzed at a first point in time and the analyzed images may be stored in a database, each image being stored in association with the at least one intrinsic or extrinsic parameters. Then, at a second point in time, stored images may be selected from the database and 3D reconstruction may be performed based on the selected images. Thus, a database may even be configured to receive images over a long period of time, wherein each image is analyzed when received and stored in the database for later use. Since each image may be analyzed separately, it is possible to perform the analysis in advance and then use the information from the previously performed analysis whenever the 3D reconstruction of the scenery is desired (e.g. when a sufficient number of images have been collected).

The use of a machine-learned model for extracting intrinsic and/or extrinsic parameters implies that metadata (e.g. acquired by separate sensors and/or through complex calibration of a camera before image acquisition) images to be used in 3D reconstruction According to an embodiment, the analysis of the image uses the method according to any of the embodiments described above for the first aspect. In particular, the analysis of the image may comprise: receiving the image to be analyzed; processing the image with a machine-learned model, wherein the machine-learned model is configured to predict at least an intrinsic parameter of the image using at least a first variable of the machine-learned model, wherein the first variable defines a relation between a radial distortion of the image and a focal length of the image; and outputting the intrinsic parameter of the image.

Thanks to the use of the first variable in the machine-learned model, the machine-learned model is robust in correctly determining at least an intrinsic parameter of the image.

According to an embodiment, for each of the plurality of images, an uncertainty of the at least one intrinsic or extrinsic parameter is predicted, and wherein the uncertainty is used as a weight of the at least one intrinsic or extrinsic parameter in a cost function for constructing the model of the scenery.

The predicted uncertainty provides information of how reliable the information extracted from each image is. Therefore, by predicting the uncertainty, the 3D reconstruction may take this into account and give the information of each image a suitable weight in the 3D reconstruction. This implies that the 3D reconstruction may be more accurate and that, incorrect or uncertain information may not negatively affect a result of the 3D reconstruction, as such information may be assigned a low weight. For instance, the 3D reconstruction may be designed to minimize or reduce an error in a cost function, wherein an error of the 3D reconstruction in relation to parameter(s) of an image having high uncertainty is penalized using a low weight so as to not have a large effect on the cost function.

According to a third aspect, there is provided a method for training a machine-learned model for analysis of an image, said method comprising: receiving a plurality of images depicting one or more sceneries and receiving ground truth information, wherein the ground truth information defines a ground truth value for at least an intrinsic parameter of each of the received plurality of images; predicting at least an intrinsic parameter for each of the plurality of images using at least a first variable of the machine-learned model, wherein the first variable defines a relation between a radial distortion of the image and a focal length of the image; determining an error of the at least an intrinsic parameter in relation to ground truth information for each of the plurality of images; and forming the machine-learned model based on reducing the determined error.

Effects and features of this third aspect are largely analogous to those described above in connection with the first and second aspects. Embodiments mentioned in relation to the first and second aspects are largely compatible with the third aspect.

Thanks to the machine-learned model being trained using the first variable, a robust machine-learned model may be formed for correctly determining at least an intrinsic parameter of the image. Also, the method may quickly converge such that the machine-learned model may be quickly determined and the training of the machine-learned model may require limited processing resources and time.

According to an embodiment, the method comprises predicting a plurality of parameters for each of the plurality of images, wherein the predicting comprises training independent regressors to predict the plurality of parameters. Hence, the method may enable predicting of a plurality of parameters. By using independent regressors, the prediction of each of the plurality of parameters may be dissociated such that each of the plurality of parameters may be individually predicted.

According to an embodiment, the predicting may further comprise extracting one or more features from each of the plurality of images, wherein the features are used by the regressors. The feature extraction may be performed by a pretrained network architecture. The feature extraction for the regressors may be performed by a common network architecture, such that the single architecture may be used for extracting the features needed for training a plurality of regressors.

Further, the extracted features may be selected to be directly visible in the image, which may facilitate that the training of the machine-learned model may quickly converge. In particular, the first variable may be directly visible in the image, in contrast to the radial distortion of the image and the focal length of the image, which may not be independently directly visible in the image.

According to an embodiment, the received ground truth information defines ground truth values for a plurality of parameters of each of the received plurality of images and the machine-learned model is trained to predict a plurality of parameters; and wherein the determining of the error comprises determining a single error metric for each image based on the plurality of parameters by comparing a projection of image points using the plurality of predicted parameters to a projection of image points using the ground truth values for the plurality of parameters.

By using a single error metric, it may be ensured that parameters with different magnitudes may be used in training of the machine-learned model without errors pertaining to certain parameters dominating the learning process. Thus, the single error metric may ensure that errors relating to different parameters are expressed within a single metric. This may therefore be advantageous in training the machine-learned model to robustly predict a plurality of parameters.

According to an embodiment, the single error metric is based on a sum of partial errors for each of the plurality of parameters, wherein each partial error defines a part of the single error metric based on comparing a projection of image points using a single predicted parameter in combination with ground truth values for other parameters of the plurality of parameters to the projection of image points using the ground truth values for the plurality of parameters.

When using a single error metric, a cause of the error may be attributed to more than one parameter. Thus, thanks to the use of partial errors, sources of errors may be disentangled to ensure that the machine-learned model is trained to correctly predict the plurality of parameters.

The partial errors may be determined by using ground truth values of the parameters that are not to contribute to the partial error, so that an error in the projection of image points may be attributed to a single parameter.

Thanks to sources of errors being disentangled convergence of the machine-learned model may be increased and a final accuracy of the machine-learned model may be increased.

According to a fourth aspect, there is provided a method for generating a dataset of images for training a machine-learned model for analysis of an image, said method comprising: selecting images for forming the dataset of images from a database of images, wherein the images are selected based on metadata of the images to ensure a diversity of at least one image parameter in the group of: a type of camera used for acquiring the image, camera extrinsic parameters, time of day of acquiring the image, location, such as GPS location, of the image, and a class of scenery depicted by the image, wherein the diversity of the at least one image parameter for the selected images corresponds to the diversity of the at least one image parameter within the database of images; and determining ground truth information for each of the selected images.

Effects and features of this fourth aspect are largely analogous to those described above in connection with the first, second and third aspects. Embodiments mentioned in relation to the first, second and third aspects are largely compatible with the fourth aspect.

Thanks to the images in the dataset used for training of a machine-learned model being selected to ensure diversity, the machine-learned model may be trained to enable later handling of diversity of the at least one image parameter in analysis of images using the machine-learned model.

The method may use a large database of images to determine variations of parameters within the database. Thus, a knowledge of a variation of the at least one image parameter may be used for selecting the dataset of images for training of the machine-learned model. This implies that the machine-learned model may be trained to provide robust prediction for corresponding variations of the at least one image parameter when the machine-learned model is deployed.

Also, the machine-learned model may be trained using images having values of an image parameter to be predicted at edges of a range of values within which the image parameter varies so as to ensure that the machine-learned model may be able to correctly predict image parameters within the entire range of feasible values.

The method may involve analysis of the database of images to determine a range or variation of the image parameter within the database. Thus, the analysis may provide a measure of diversity the at least one image parameter, which measure may then be used when selecting images.

According to an embodiment, the machine-learned model is to be trained to predict intrinsic and/or extrinsic parameters of the image.

The images may further be selected based on metadata of the images to ensure a diversity of at least one image parameter being an intrinsic and/or extrinsic parameter to be predicted.

According to another embodiment, 3D reconstruction of a scenery is performed based on the database of images, wherein the 3D reconstruction is used for generating ground truth information for the selected images.

By using 3D reconstruction, the scenery depicted by images in the database may be modeled. This implies that a model may be formed based on a plurality of images, which may enable ground truth information of intrinsic and/or extrinsic parameters of images to be reliably determined (as the information is based on a collection of a large number of images, which may ensure that individual uncertainty from single images may be avoided). This also ensures that a database comprising a collection of images which may be collected in an uncontrolled environment, such as images collected through crowdsourcing, may be used as a basis for generating an appropriate dataset of images for training a machine-learned model.

In addition, the images may be selected based on filtering in relation to a metric on quality of the 3D reconstruction. Thus, the selected images may be part of high quality 3D reconstruction, such that it may be ensured that the ground truth information of intrinsic and/or extrinsic parameters of the images is determined with high accuracy.

According to another embodiment, panoramic images may be used to synthetically generated imagery with known intrinsics and/or extrinsic parameters to be used for training the machine-learned model. This may be performed by cropping and distorting a region of the panoramic image according to arbitrarily chosen values for the intrinsic and/or extrinsic parameters. For the synthetic generation of images with known extrinsic parameters, the extrinsic parameters of the panoramic imagery (tilt and roll angles) are required and may be obtained from metadata, human annotations or through the recovery of the parameters through 3D reconstructions of scenery from a collection of panoramic images.

According to a fifth aspect, there is provided a computer program product comprising computer-readable instructions such that when executed on a processing unit the computer program product will cause the processing unit to perform the method according to any of the aspects described above.

According to a sixth aspect, there is provided a device comprising a processing unit configured to perform the method according to any of the aspects described above.

Effects and features of these fifth and sixth aspects are largely analogous to those described above in connection with the first, second, third and fourth aspects. Embodiments mentioned in relation to the first, second, third and fourth aspects are largely compatible with the fifth and sixth aspects.

The computer program product may implement the method of the first, second, third or fourth aspect. Thus, when the computer program product is executed the method may be performed.

The device may be configured to perform the method of the first, second, third or fourth aspect. The device may comprise a dedicated processing unit for performing the method or may be a general-purpose processing unit which may be able to perform the method based on executing a dedicated computer program product.

BRIEF DESCRIPTION OF DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIGS. 3a-b are schematic images illustrating effect on an image of different values of focal length and the first radial distortion parameter.

FIG. 4 is a flow chart of a method for analysis of an image according to an embodiment.

DETAILED DESCRIPTION

Figure 1:
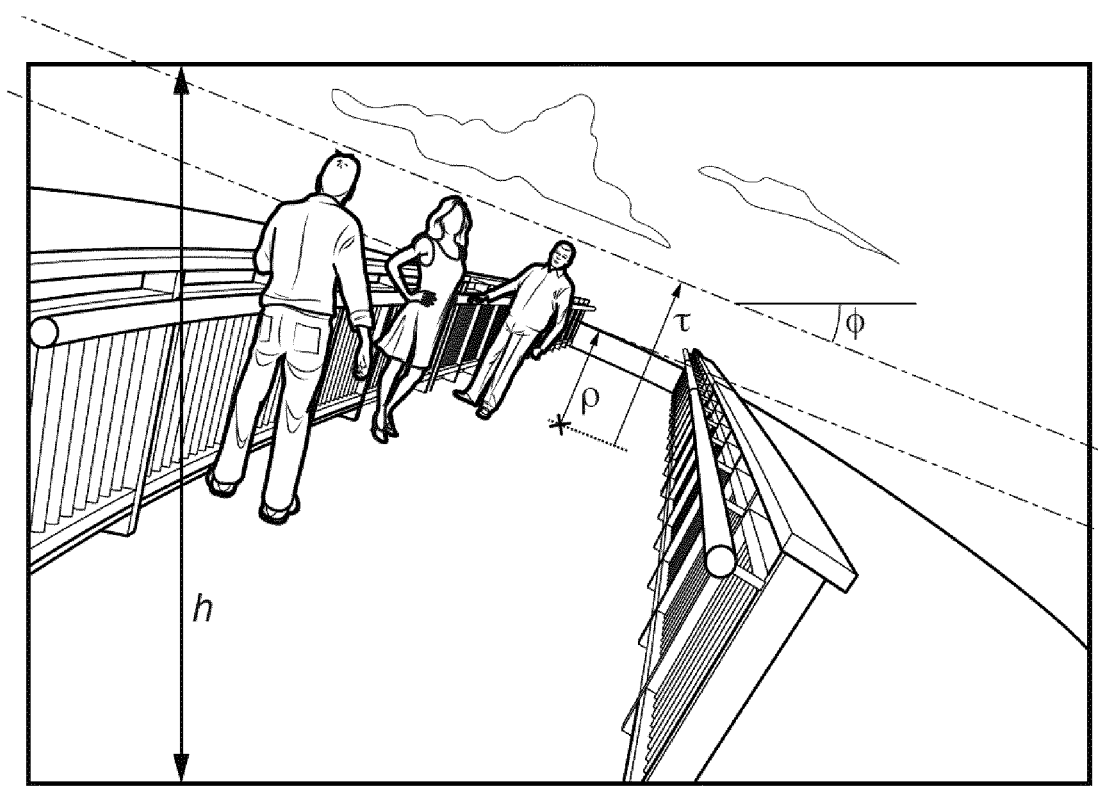
FIG. 1 shows an image illustrating a camera model.

The present inventive concept may provide an improvement in analysis of images and use of results of such analysis, wherein the analysis of images is based on machine-learning. In order to describe the present inventive concept, initially a camera model and parameterization of variables in an image will be discussed so as to explain insights used in the machine-learned model.

According to the present inventive concept, a machine-learned model is trained to predict at least an intrinsic parameter of a given image. Advantageously, the machine-learned model is trained to predict intrinsic and extrinsic parameters of the image and in the following description, the prediction of both intrinsic and extrinsic parameters will be described. However, it should be realized that the machine-learned model may be trained to merely predict at least an intrinsic parameter.

A convolutional neural network (CNN) may be trained to form the machine-learned model. However, it should be realized that other types of artificial neural networks may be used for training. Also, it should be realized that other types of machine learning methods may be used for training.

The machine-learned model may be trained using independent regressors that share a common pretrained network architecture as a feature extractor. Thus, a pretrained network architecture, which may be generally trained to extract features in images, may be used as feature extractor. The pretrained network architecture may be fine-tuned to extract features needed for the particular training for predicting intrinsic and extrinsic parameters. Alternatively, a feature extractor may be separately trained for enabling forming of the machine-learned model to predict intrinsic and extrinsic parameters.

Instead of training the regressors to predict tilt $\theta$, roll $\psi$, focal length f, and distortion parameters $k_1$ and $k_2$, which may be the parameters that are desired to be output in analysis of an image using the machine-learned model, proxy variables are used. The proxy variables may be selected to be directly visible in the image and independent from each other, which may facilitate training of the machine-learned model.

Camera Model

The training of the machine-learned model is discussed below in relation to a camera model with square pixels and centered principal point that is affected by radial distortion that can be modeled by a two-parameter polynomial distortion according to the Brown-Conrady model.

The projection model is the following. World points are transformed to local reference frame of the camera by applying a rotation R and translation t. Let (X, Y, Z) be coordinates of a 3D point expressed in the local reference frame of the camera. The point is projected to a plane Z=1 to obtain normalized image coordinates (x, y)=(X/Z, Y/Z). Radial distortion scales the normalized coordinates by a factor d, which is a function of radius r and distortion parameters $k_1$ and $k_2$:

$$r=\sqrt{x^2+y^2}$$

$$d=1+k_1 r^2+k_2 r^4 \quad (Eq\ 1)$$

$$(x_d, y_d)=(dx, dy) \quad (Eq\ 2)$$

where $x_d$, $y_d$ are the scaled normalized coordinates.

Finally, the focal length f scales the normalized and distorted image coordinates to pixels: $(u_d, v_d)=(f\ x_d, f\ y_d)$.

In the present work, a horizon line may be used as a reference frame, leaving two free parameters: the tilt angle $\theta$, and roll angle $\psi$ of the camera with respect to the horizon line. This allows a network to be trained using images from a set of locations to generalize well to other places, as long as there is sufficient visual diversity.

Thus, the parameters to be recovered by the machine-learned model are the tilt and roll angles ($\theta$, $\psi$), the focal length f and distortion parameters $k_1$ and $k_2$.

Parameterization

Parameters such as the focal length or the tilt angles are difficult to interpret from image content. Instead, they can be better represented by proxy variables that are directly observable in the image. Proxy variables which depend on the focal length or the tilt angles may thus be selected.

Referring now to FIG. 1, parameterization that may be used will be described in further detail.

Initially, the horizon line is defined. According to an embodiment, the horizon line may be defined as done in "S. Workman, M. Zhai, and N. Jacobs, "Horizon Lines in the Wild," Proceedings British Machine Vision Conference 2016, pp. 1-12, 2016: "*The image location of the horizon line is defined as the projection of the line at infinity for any plane which is orthogonal to the local gravity vector*". This definition also holds true for cameras with radial distortion, however, the projection of the horizon line in the image will not necessarily remain a straight line. Rather, if there is radial distortion, the horizon line (and any other straight lines) will only be projected as a straight line in the image if the line passes through center of the image.

The focal length f is related to the vertical and horizontal fields of view through the image size of height h and width w. The field of view is directly related to the image content and is thus more suitable for the task of recovering the focal length of the image.

According to an embodiment, the vertical field of view $F_v$ is used as a proxy for the focal length f, with the vertical field of view $F_v$ defined as:

$$F_v = 2\ \arctan\frac{h}{2f}. \quad (Eq\ 3)$$

During deployment of the machine-learned model, the image height h as illustrated in FIG. 1 is known and the focal length f can be recovered from the predicted $F_v$.

The roll angle $\psi$ of the camera is directly represented in the image as the angle of the horizon line as illustrated in FIG. 1, not requiring any alternative parameterization.

A good proxy variable for the tilt angle $\theta$ is the distance $\rho$ from the center of the image to the horizon line. However, the presence of radial distortion complicates the relationship between the tilt angle $\theta$ and the distance $\rho$ slightly.

First the undistorted offset $\tau$ is defined as the distance from the image center to the horizon line when there is no radial distortion. The undistorted offset $\tau$ can be expressed as a function of the tilt angle $\theta$, the focal length f and the image height h as $$\tau = \frac{2f}{h} \tan \theta. \quad (Eq\ 4)$$

The distance $\rho$ from the center of the image to the horizon line, which may also be referred to as a distorted offset $\rho$ is related with $\tau$ by the radial distortion scaling as expressed in Eq 2.

It has been realized that the radial distortion model may be simplified by expressing $k_2$ as a function of $k_1$. This may improve predicting of the radial distortion parameters. It has been realized that for images from real lenses, the distortion parameters seem to lie in a manifold. This has been confirmed by studying the distribution of $k_1$ and $k_2$ on a large collection of camera calibrations.

Figure 2:
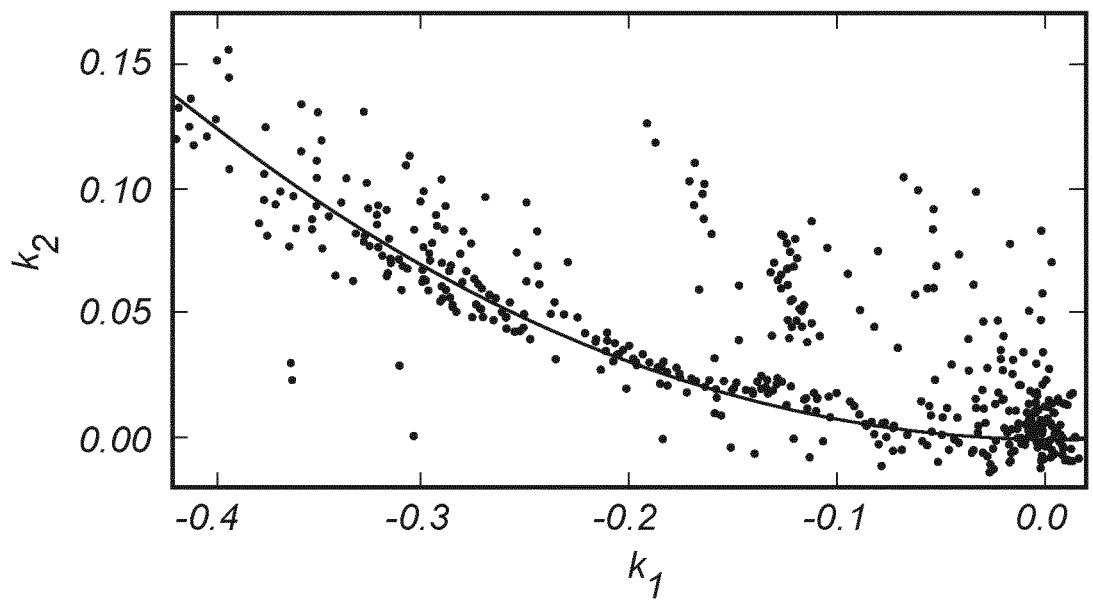
FIG. 2 shows a graph illustrating a relation between a first and a second radial distortion parameter.

In FIG. 2, a distribution of radial distortion parameters $k_1$ and $k_2$ is disclosed, illustrating that the parameters lie close to a one-dimensional manifold. The distribution of radial distortion parameters $k_1$ and $k_2$ was determined based on a large number of images on which SfM reconstruction was made to recover the radial distortion parameters $k_1$ and $k_2$ as an output of the SfM processing.

From the distribution in FIG. 2, an analytic expression as a model of this distribution may be defined by fitting a second degree polynomial:

$$k_2 = 0.019 k_1 + 0.805 k_1^2. \quad \text{(Eq 5)}$$

It should be realized that the analytic expression may be varied and may shift in dependence of e.g. a number of images used for analyzing the relationship between the radial distortion parameters. Also, a range of feasible values of the second radial distortion parameter $k_2$ based on the value of the first radial distortion parameter $k_1$ may be defined, so as to define a range which represents a likely value of the second radial distortion parameter $k_2$.

Further, two main groups of lenses have been observed: fisheye lenses, exhibiting strong radial distortion, with $k_1 < 0$ and positive $k_2$ increasing in a quadratic manner with the magnitude of $k_1$, and conventional lenses, with both $k_1$ and $k_2$ close to 0. As illustrated in FIG. 2, the expression in Eq 5 may be valid for both groups of lenses. However, in an alternative embodiment, separate expressions may be used in different ranges of values of $k_1$ and $k_2$ such that each expression may be fitted to a particular type of lens. Also, it should be understood that, in the above, use of a perspective projection model is assumed, since perspective projection model may still be used for fisheye lenses. However, for fisheye lenses, a fisheye projection model may alternatively be used, but such fisheye projection model still involves a polynomial distortion model, so radial distortion may still be handled in a similar manner, although the relationship in e.g. Eq 5 may be different.

Inferring the value of the first radial distortion parameter $k_1$ from an image is not trivial. A human observer would probably make a guess based on the bending of straight lines. Nevertheless, both the focal length f and the radial distortion parameters $k_1$ and $k_2$ determine such bending. Radial distortion is more noticeable towards boundaries of the image but, as the focal length f increases, a smaller crop of the center of the image is gradually seen.

As discussed for the focal length f and the tilt angle θ above, an alternative proxy variable may be used to express $k_1$ in terms of a visible magnitude, i.e. the distortion that is observed in the image. Thus, the machine-learned model may be trained to predict an apparent distortion coefficient that is herein referred to as $\hat{k}_1$.

As stated in above, the camera model projects points (X, Y, Z) in a local reference frame of the camera to two-dimensional normalized image coordinates (x, y)=(X/Z, Y/Z).

In absence of radial distortion, pixels are obtained from undistorted normalized coordinates as (u, v)=(f x, f y). When there is radial distortion, the radius of the normalized coordinates is first distorted before being converted to pixels $(u_d, v_d) = (f\, d\, x, f\, d\, y)$. In other words, since the distortion is applied to the normalized image coordinates, the visual effect not only depends on the radial distortion parameters $k_1$ and $k_2$, but also on the focal length f.

Instead, the radial distortion effect is represented herein as a relationship between the distorted $(u_d, v_d)$ and undistorted pixels (u, v).

First, the radius of a point r in normalized coordinates is expressed in relation to its equivalent in pixel units $r_{px}$:

$$r = \frac{r_{px}}{f}. \quad \text{(Eq 6)}$$

The same relationship holds when there is distortion:

$$r^{(d)} = \frac{r_{px}^{(d)}}{f}. \quad \text{(Eq 7)}$$

The undistorted and distorted points in normalized coordinates are related by Eq 2 and can be expressed as:

$$r^{(d)} = r(1 + k_1 r^2 + k_2 r^4), \quad \text{(Eq 8)}$$

in which r and $r^{(d)}$ from Eq 6 and Eq 7 may be substituted to obtain a relationship between the radii in pixel units, obtaining the apparent distortion parameter $\hat{k}_1$ and $\hat{k}_2$.

$$r_{px}^{(d)} = r_{px}\left(1 + \frac{k_1}{f^2} r_{px}^2 + \frac{k_2}{f^4} r_{px}^4\right), \quad \text{(Eq 9)}$$

where $$\hat{k}_1 = \frac{k_1}{f^2}, \quad \text{(Eq 10)}$$

and $$\hat{k}_2 = \frac{k_2}{f^4}.$$

It is observed that for a fixed value of $k_1$, $\hat{k}_1$ decreases as f increases and vice-versa, representing the effect of radial distortion independently from f. This is further illustrated in FIGS. 3a-b, wherein the first radial distortion parameter $k_1$ and the focal length f are varied while keeping a constant value of $\hat{k}_1 = -0.2$. In FIG. 3a, the focal length f=0.8 and the first radial distortion parameter $k_1 = -0.13$, whereas in FIG. 3b, the focal length f=3.2 and the first radial distortion parameter $k_1 = -2.05$. In FIGS. 3a-b, curvature of the lines remains constant after zooming in, indicating that an apparent distortion remains constant and that training of the machine-learned model to predict the apparent distortion parameter $\hat{k}_1$ will be possible.

Given a prediction of $\hat{k}_1$ and f, both recoverable from the outputs of the machine-learned model as discussed above, $k_1$ and $k_2$ can be retrieved through Eq 5 and Eq 10.

In summary, intrinsic and extrinsic parameters of an image may be represented with $\Omega = (\psi, \rho, F_v, \hat{k}_1)$, where ψ is the roll angle, ρ is the distorted offset, $F_v$ is the vertical field of view and $\hat{k}_1$ is the apparent radial distortion.

Referring now to FIG. 4, a method for analysis of an image will be described. The method may be implemented by a computer program product comprising computer-readable instructions such that when executed on a processing unit the computer-readable instructions cause a processing unit to perform the method. According to an embodiment, the computer program product may comprise a computer-readable medium on which the computer-readable instructions are stored. According to another embodiment, the computer program product may comprise a signal carrying the computer-readable instructions.

The method may be implemented in a device comprising a processing unit for executing steps to perform the method. The processing unit may be implemented as any computer unit (or network of computer units). Thus, the processing unit may be implemented "in the cloud".

The processing unit may be implemented e.g. as a central processing unit (CPU), which may execute the instructions of one or more computer programs in order to implement the method.

The processing unit may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement the method.

The method may comprise receiving the image to be analyzed. The image may be acquired by a camera and may be transmitted to e.g. a processing unit in which the method is performed for analysis. Thus, the image may be received directly from a camera. However, it should be realized that the image may be temporarily or long-term stored in a memory, such as in a database of images, and may be received for analysis, e.g. when analysis of the image is requested or needed.

A processing unit performing the analysis may have access to the machine-learned model, as described above. The image may then be processed 404 with the machine-learned model. In the processing of the image with the machine-learned model, the machine-learned model may at least use a first variable that defining a relation between a radial distortion of the image and the focal length of the image.

According to an embodiment, the method involves predicting intrinsic and extrinsic parameters of the image represented by $\Omega=(\psi, \rho, F_v, \hat{k}_1)$, as described above.

The processing of the image may output 406 at least an intrinsic parameter of the image. The processing may output the variables $\psi, \rho, F_v, \hat{k}_1$, which may be directly determined from the machine-learned model.

However, as discussed above, at least some of the variables may be used as proxy variables allowing the machine-learned model to quickly converge and the analysis may further comprise predicting intrinsic and/or extrinsic parameters of interest based on the variable(s) of the machine-learned model. For instance, the field of view $F_v$ may form basis to predict the focal length f, the distorted offset $\rho$ may form basis to predict the tilt angle $\theta$, and the apparent radial distortion $\hat{k}_1$ may form basis to predict the first radial distortion parameter $k_1$ and, via Eq 5, the second radial distortion parameter $k_2$.

In addition to predicting the intrinsic and/or extrinsic parameters, an uncertainty of the parameters may also be predicted. Thus, a reliability of the predicted parameters may be provided, so that a proper weight may be given to the predicted parameters. The uncertainty may be used to weigh information of predicted parameters of an image to other information, such as information of predicted parameters of other images. This may ensure robust use of the information in further processing of the image, e.g. when processing a plurality of images in conjunction for forming a combined representation of a scenery.

According to an embodiment, the predicted parameter(s) may be used for correcting the image. Thus, the image may be processed using the predicted parameter(s) for reducing distortion effects introduced when the image was acquired. For instance, the image may be rotated to align a horizon line to be parallel with top and bottom edges of the image. Also, radial distortion effects may be removed or reduced.

Thus, a corrected image may be formed, which may be provided for display to a user. The corrected image may provide an improved experience to a user observing the image. In particular, image correction may be advantageous when the image is to be displayed in a sequence of images, as it may ensure that e.g. the horizon line does not shift between images within the displayed sequence.

The corrected image may also be used in further processing of the image in conjunction with other images, e.g. for representing a scenery depicted by the images. However, it should be realized that the image need not necessarily be corrected in order to allow the image to be used in forming of the representation of the scenery.

Thus, according to an embodiment, the image may be further processed to correct coordinates of feature points in the image based on the intrinsic and/or extrinsic parameters. The feature points may represent points in the scenery which may be used in order to determine relations between the images and which may further be used in order to e.g. reconstruct models of objects in the image. The actual coordinates of feature points, as represented in the image, may therefore be used to relate images to each other. By correcting the coordinates of the feature points based on the predicted intrinsic and/or extrinsic parameters, the information available in the image may be correctly used in the image processing, without a need of performing image correction on the entire image.

Figure 5:
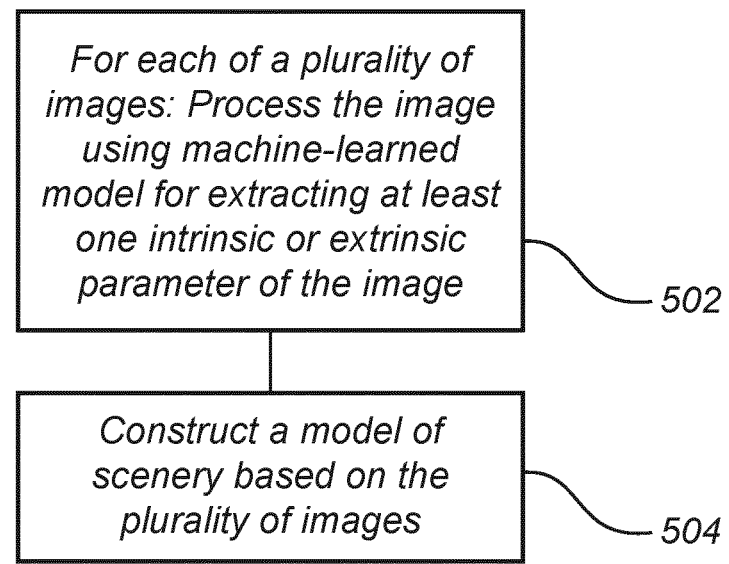
FIG. 5 is a flow chart of a method for three-dimensional reconstruction of a scenery according to an embodiment.

Referring now to FIG. 5, a method for three-dimensional reconstruction of a scenery based on a plurality of images of the scenery will be described. As for the method described in relation to FIG. 4, this method may be implemented by a computer program product comprising computer-readable instructions such that when executed on a processing unit the computer-readable instructions cause a processing unit to perform the method. According to an embodiment, the computer program product may comprise a computer-readable medium on which the computer-readable instructions are stored. According to another embodiment, the computer program product may comprise a signal carrying the computer-readable instructions.

The method may be implemented in a device comprising a processing unit for executing steps to perform the method. The processing unit may be implemented as any computer unit (or network of computer units). Thus, the processing unit may be implemented "in the cloud".

The processing unit may be implemented e.g. as a central processing unit (CPU), which may execute the instructions of one or more computer programs in order to implement the method.

The processing unit may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement the method.

The method may comprise receiving a plurality of images to be used in the analysis. The images may be acquired by one or more cameras and may be transmitted to e.g. a processing unit in which the method is performed for analysis. Thus, the image may be received directly from the one or more cameras. However, it should be realized that the image may be temporarily or long-term stored in a memory, such as in a database of images, and may be received for 3D reconstruction, e.g. when 3D reconstruction is requested or needed or when a sufficient number of images are available for forming a 3D reconstruction.

A processing unit performing the 3D reconstruction may have access to a machine-learned model for predicting at least one intrinsic or extrinsic parameter of the image. The machine-learned model as described above may be used.

However, it is realized that intrinsic and/or extrinsic parameters provide valuable input for 3D reconstruction of the scenery. Thus, the constructing of a model of the scenery based on plurality of image may be improved by using intrinsic and/or extrinsic parameters as input to the 3D reconstruction. By enabling predicting of intrinsic and/or extrinsic parameters for single images, i.e. predicting the intrinsic and/or extrinsic parameters for a given image based only on processing of the given image and not using other images to provide further input, the method facilitates inclusion of images acquired in any manner in the 3D reconstruction.

The method may thus comprise, for each of a plurality of images, processing 502 the image using a machine-learned model for extracting at least one intrinsic or extrinsic parameter of the image. Thus, intrinsic and/or extrinsic parameters may be automatically provided for the images to be included in 3D reconstruction.

The method may further comprise constructing 504 a model of the scenery based on the plurality of images, wherein the at least one intrinsic or extrinsic parameter of each image is used as input in constructing the model. The 3D reconstruction may use a cost function for representing an error between the model and the information depicted in the plurality of images. The 3D reconstruction may aim to reduce or minimize a value of the cost function so as to fit the model of the scenery to the information in the images.

According to an embodiment, an uncertainty of the at least one intrinsic or extrinsic parameter is predicted, wherein the uncertainty is used as a weight of the at least one intrinsic or extrinsic parameter in the cost function. Thus, the uncertainty in predicting parameters based on the machine-learned model may be used as input to properly weight the use of this information in constructing the model of the scenery.

The 3D reconstruction may for instance be performed by a Structure from Motion (SfM) process, as known by the person skilled in the art. However, it should be realized that other processes for 3D reconstruction may be used, such as using simultaneous localization and mapping (SLAM).

Now, determining of errors for training of the machine-learned model will be further described.

When a single architecture is trained to predict parameters with different magnitudes, special care must be taken to weigh the loss components such that the estimation of certain parameters does not dominate the learning process. It is noticed that for the case of camera calibration, instead of optimizing the camera parameters separately, a single metric based on the projection of points with the estimated and ground truth camera parameters can be used.

In this regard, the camera model may be viewed as a simplified bidirectional mapping from pixel coordinates in the image plane to directional vectors in 3D (herein called bearings). The intrinsic and extrinsic parameters of the image determine a direction of one such bearing for each pixel in the image. Herein, a bearing loss measures errors on these direction vectors instead of individual parameter errors, achieving the goal of representing all the parameter errors as a single metric.

Figure 6:
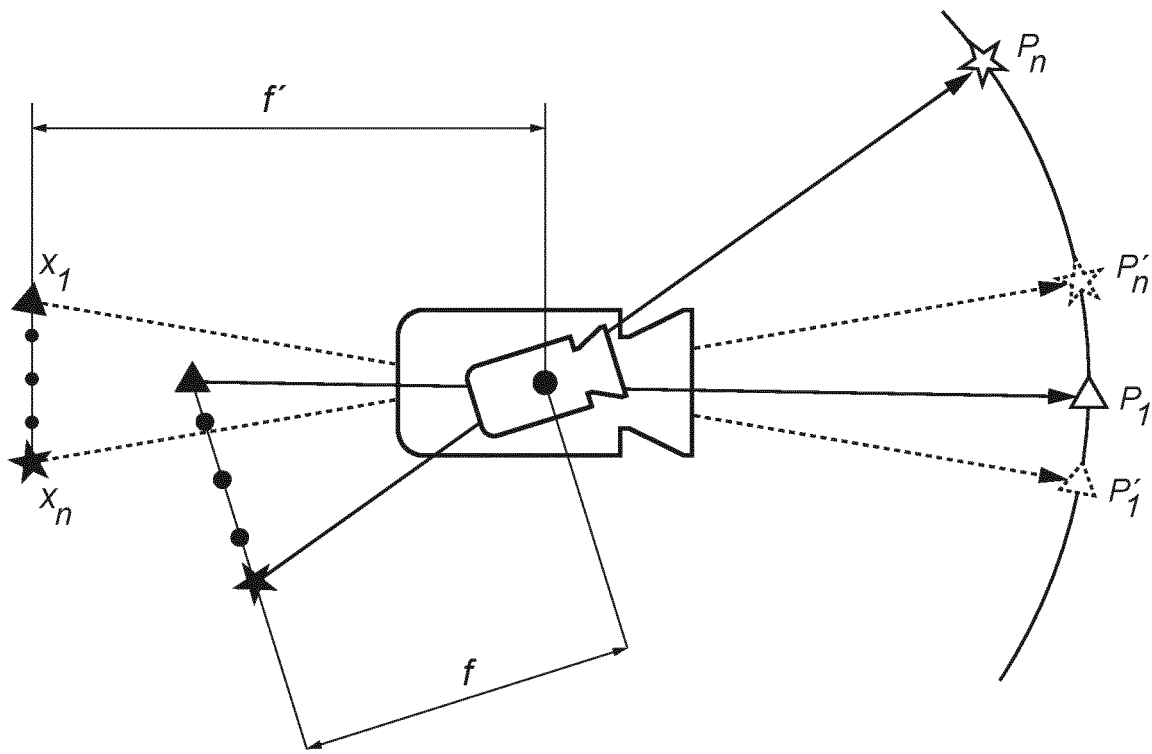
FIG. 6 is a schematic view illustrating a single error metric for determining errors based on a plurality of parameters of an image.

Referring to FIG. 6, the projections used for the bearing loss are illustrated in a simplified manner by reduction to two parameters: tilt angle θ represented by orientation of the cameras and focal length f. Two cameras (one illustrated with dashed lines and one illustrated with solid lines) are used to project a regular grid of points in the image plane $x_1 \ldots x_n$ onto a unit sphere. The points $p_1 \ldots p_n$ shown at ends of solid vectors are projected using ground truth parameters $\Omega=(\theta, f)$. The points $p_1' \ldots p_n'$ shown at ends of dashed vectors are projected using predicted parameters $\Omega'=(\theta', f')$. The deviation between points projected using predicted parameters and points projected using ground truth parameters may be used for optimizing a loss and finding a best prediction of the parameters.

Thus, given an image taken with known camera parameters $\Omega=(\psi, \rho, F_v, \hat{k}_1)$ and a prediction of such parameters $\Omega'=(\psi', \rho', F_v', \hat{k}_1)$, the bearing loss may be calculated as follows.

First, a regular grid of points $x_1 \ldots x_n$ is projected from the image plane onto the unit sphere using the ground truth parameters $\Omega$ obtaining the ground truth bearings $p_1 \ldots p_n$.

Then, the predicted parameters $\Omega'$ are used to project the same grid points onto the unit sphere, obtaining the set of predicted bearings $p_1' \ldots p_n'$. The bearing loss L may be defined as the mean squared deviation between the two sets of bearings:

$$L(\Omega', \Omega) = \frac{1}{n}\sum_{i=1}^{n}(p_i' - p_i)^2. \quad \text{(Eq 11)}$$

To optimize this loss, it is desired that the mapping from pixels to bearings is differentiable. This includes a radial undistortion step, which does not have a closed-form solution. Although there are several solutions for r in $r^{(d)}=r(1+k_1r^2+k_2r^4)$, the correct solution is that where r is closest to $r^{(d)}$, which can be reliably found by performing fixed point iteration of the function $r_{n+1}=r^{(d)}/(1+k_1r_n^2+k_2r_n^4)$ initialized at $r_0=r^{(d)}$. This process is differentiable and can be used during training to backpropagate gradients through the bearing loss.

The bearing loss proposed above solves the problem of balancing the impact of parameters in the learning process by expressing different errors in terms of a single metric. However, using several parameters to predict the bearings introduces a new problem during learning: the deviation of a point from its ideal projection can be attributed to more than one parameter. In other words, an error from one parameter can backpropagate through the bearing loss to other parameters.

For example, picture a scenario where, for a training sample, the machine-learned model predicts all parameters perfectly except for an excessively small field of view: The predicted bearings $p_1' \ldots p_n'$ are projected onto a smaller area on the unit sphere than the ground truth bearings $p_1 \ldots p_n$.

In this case, there is more than one parameter that could be modified to decrease this distance: both the focal length f and the radial distortion parameters $k_1$ and $k_2$ can be changed to decrease the loss, but only the value of the focal length f should be modified, as the radial distortion has been perfectly predicted in this example. In other words, there will be gradients propagating back through both parameters, even though one of them is correct, causing the model to deviate from the optimal solution. In practice, this slows down learning and causes the accuracy to stagnate.

To avoid this problem, sources of loss may be disentangled so as to evaluate the loss individually for each parameter $\psi$, $\rho$, $F_v$, $\hat{k}_1$:

$$L_\psi = L\left(\left(\psi, \rho^{GT}, F_v^{GT}, \hat{k}_1^{GT}\right), \Omega\right) \quad \text{(Eq 12)}$$

$$L_\rho = L\left(\left(\psi^{GT}, \rho, F_v^{GT}, \hat{k}_1^{GT}\right), \Omega\right)$$

$$L_{F_v} = L\left(\left(\psi^{GT}, \rho^{GT}, F_v, \hat{k}_1^{GT}\right), \Omega\right)$$

$$L_{\hat{k}_1} = L\left(\left(\psi^{GT}, \rho^{GT}, F_v^{GT}, \hat{k}_1\right), \Omega\right)$$

$$L^* = \frac{L_\psi + L_\rho + L_{F_v} + L_{\hat{k}_1}}{4},$$

where $L_\psi$, $L_\rho$, $L_{F_v}$, and $L_{\hat{k}_1}$ are respective partial errors for each of the plurality of parameters and L* is a combined error using a single metric, wherein the different parameters have been disentangled as separate sources of errors.

This modification of the loss function may greatly increase convergence and final accuracy of the machine-learned model, while maintaining the main advantage of the bearing loss of expressing all parameter errors in the same units.

Figure 7:
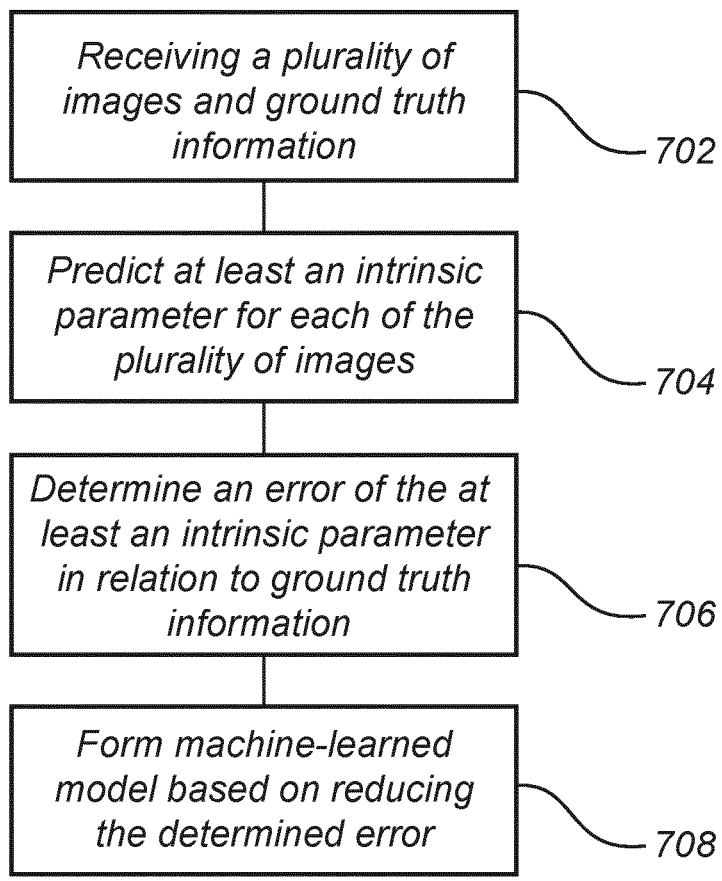
FIG. 7 is a flow chart of a method for training a machine-learned model according to an embodiment.

Referring now to FIG. 7, a method for training a machine-learned model will be summarized. The method may be implemented by a computer program product comprising computer-readable instructions such that when executed on a processing unit the computer-readable instructions cause a processing unit to perform the method. According to an embodiment, the computer program product may comprise a computer-readable medium on which the computer-readable instructions are stored. According to another embodiment, the computer program product may comprise a signal carrying the computer-readable instructions.

The method may be implemented in a device comprising a processing unit for executing steps to perform the method. The processing unit may be implemented as any computer unit (or network of computer units). Thus, the processing unit may be implemented "in the cloud".

The processing unit may be implemented e.g. as a central processing unit (CPU), which may execute the instructions of one or more computer programs in order to implement the method.

The processing unit may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement the method.

The method may comprise receiving 702 a plurality of images depicting one or more sceneries and receiving ground truth information, wherein the ground truth information defines a ground truth value for at least an intrinsic parameter of each of the received plurality of images. The ground truth information may be acquired through metadata, e.g. obtained by further sensors used when acquiring the image. Alternatively, the ground truth information may be acquired through further robust analysis of the images, such as processing a plurality of images for 3D reconstruction and then determining the parameters based on the 3D reconstruction formed. As another alternative, images may be generated by cropping images from panorama images, defining intrinsic and/or extrinsic parameters based on the parts cropped from the panorama image. As yet another alternative, traditional calibration, involving acquiring a large set of image in laboratory conditions, may be used for providing the ground truth values.

The method may further comprise predicting 704 at least an intrinsic parameter for each of the plurality of images using at least a first variable of the machine-learned model, wherein the first variable defines a relation between a radial distortion of the image and a focal length of the image. Thus, the training may involve determining a prediction for at least an intrinsic parameter, wherein the intrinsic parameter may be selected to be directly visible in the image so as to facilitate prediction.

The method may further comprise determining 706 an error of the at least an intrinsic parameter in relation to ground truth information for each of the plurality of images and forming 708 the machine-learned model based on reducing the determined error. Thus, an error in the prediction may be determined and by reducing the error the prediction may be improved in order to improve capacity of the machine-learned model to properly predict parameters.

Figure 8:
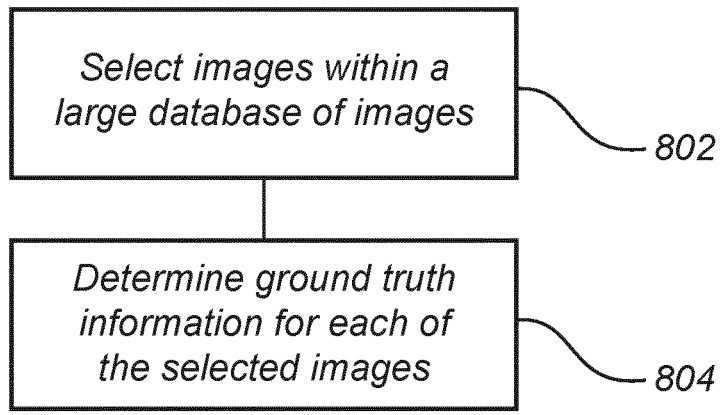
FIG. 8 is a flow chart of a method for generating a dataset of images for training a machine-learned model according to an embodiment.

Referring now to FIG. 8, a method for generating a dataset of images for training a machine-learned model for analysis of an image will be described. The method may be implemented by a computer program product comprising computer-readable instructions such that when executed on a processing unit the computer-readable instructions cause a processing unit to perform the method. According to an embodiment, the computer program product may comprise a computer-readable medium on which the computer-readable instructions are stored. According to another embodiment, the computer program product may comprise a signal carrying the computer-readable instructions.

The method may be implemented in a device comprising a processing unit for executing steps to perform the method. The processing unit may be implemented as any computer unit (or network of computer units). Thus, the processing unit may be implemented "in the cloud".

The processing unit may be implemented e.g. as a central processing unit (CPU), which may execute the instructions of one or more computer programs in order to implement the method.

The processing unit may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement the method.

The method may advantageously be used for selecting 802 images within a large database of images. Thus, when a very large number of images is available, it is possible to provide a dataset of images particularly suited to the needs for properly training a machine-learned model. For instance, if a database of crowdsourced images is available, a very large number of images may be available.

The selection of images for the dataset may be performed so as to provide a suitable dataset for training while still using a limited number of images. It should be realized that simply using all available images in the training may allow for obtaining a well-trained machine-learned model, but may not be realistic in terms of processing resources required to process all images.

The images may be selected with an aim to enable training of a machine-learned model which may generalize diverse camera models (such as action cameras, mobile phone cameras) and different sceneries (such as country variations, urban/rural environments, different weather conditions).

The images may be selected based on metadata of the images to ensure a diversity of at least one image parameter in the group of: a type of camera used for acquiring the image, time of day of acquiring the image, location, such as GPS location, of the image, and a class of scenery depicted by the image. The selected images may be harvested from the database to provide representative examples of the diversity of the respective image parameters available within the database of images.

The time of day may be used to ensure diversity in lighting conditions within the selected dataset. Thus, by using a time of day, which is simple metadata generally available in relation to an image, diversity in lighting conditions may be ensured.

The location, such as GPS location, may be used to ensure diversity in geographical distribution with the selected dataset. Thus, by using the location, which is also simple metadata generally available in relation to an image, diversity in country variations may be ensured.

A neural network may be trained to perform scene classification, such that the images in the database may be classified and associated with a class of scenery label. Then, the class of scenery may be used to ensure diversity e.g. in urban/rural environments.

Also, a variation of intrinsic and/or extrinsic parameters within the database may be assessed, such that the images may be selected so as to ensure a diversity in the intrinsic and/or extrinsic parameters. In particular, the images may be selected to provide representative examples spanning an entire range of available values of intrinsic and/or extrinsic parameters within the database, possibly with exception for extraordinary outlier values.

Thus, the machine-learned model may be trained using images having values of an image parameter to be predicted at edges of a range of values within which the image parameter varies so as to ensure that the machine-learned model may be able to correctly predict image parameters within the entire range of feasible values.

The method may further comprise determining 804 ground truth information for each of the selected images. The ground truth information may provide ground truth values of intrinsic and/or extrinsic parameters for the images in the selected dataset so as to provide values against which the machine-learned model may be trained.

The ground truth information may be received by manual annotation (at least for tilt and roll angles of the image).

The ground truth information may be obtained from metadata of the images, such as information that may be determined e.g. by sensors in a camera used for acquiring an image. In this way, recorded tilt and roll angles and intrinsic parameters may be provided as metadata for the images.

The ground truth information may be obtained from an auto-calibration process, which may enable intrinsic parameters to be determined.

According to another embodiment, 3D reconstruction of a scenery is performed based on the database of images, wherein the 3D reconstruction is used for generating ground truth information for the selected images.

By using 3D reconstruction, the scenery depicted by images in the database may be modeled. This implies that a model may be formed based on a plurality of images, which may enable ground truth information of intrinsic and/or extrinsic parameters of images to be reliably determined (as the information is based on a collection of a large number of images, which may ensure that individual uncertainty from single images may be avoided). This also ensures that a database comprising a collection of images which may be collected in an uncontrolled environment, such as images collected through crowdsourcing, may be used as a basis for generating an appropriate dataset of images for training a machine-learned model.

It should be realized that one or more of the above methods for providing ground truth information may be used for an image within the database of images and that different methods may be used for different images.

Further, the method may further comprise selecting images within the database of images by generating synthetic perspective images (images generated with perspective projection) from panoramic images (images generated with equirectangular projection) within the database. The synthetic perspective images may be generated with selected intrinsic and extrinsic parameters, wherein the parameters may be selected so as to provide a diversity in the parameters.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for analysis of an image, said method comprising:
receiving the image to be analyzed;
processing the image with a machine-learned model, wherein the machine-learned model is configured to predict at least an intrinsic parameter of the image using at least a first variable of the machine-learned model, wherein the first variable defines a relation between a radial distortion of the image and a focal length of the image; and
outputting the intrinsic parameter of the image.

2. The method according to claim 1, wherein the relation defined by the first variable is proportional to the radial distortion and inversely proportional to a square of the focal length.

3. The method according to claim 1, wherein the first variable is defined as:

$$\widetilde{k_1} = \frac{k_1}{f^2}$$

wherein $\widetilde{k_1}$ is the first variable, $k_1$ is a radial distortion parameter of the image and f is the focal length of the image.

4. The method of claim 1, wherein the machine-learned model is configured to use a pre-set relation between a first radial distortion parameter and a second radial distortion parameter.

5. The method of claim 4, wherein the machine-learned model is further configured to predict an uncertainty of the intrinsic parameter and the method further comprises outputting the uncertainty.

6. The method of claim 1, wherein the machine-learned model being configured to predict at least an intrinsic parameter of the image comprises the machine-learned model being configured to predict a field of view of the image.

7. The method of claim 6, wherein the machine-learned model is further configured to predict at least an extrinsic parameter of a camera using which the received image has been acquired.

8. The method of claim 1, further comprising correcting coordinates of feature points in the image based on the outputted intrinsic parameter.

9. A computer program product, the computer program product being embodied in a non-transitory computer readable storage medium and comprising computer-readable instructions for:
receiving the image to be analyzed;
processing the image with a machine-learned model, wherein the machine-learned model is configured to predict at least an intrinsic parameter of the image using at least a first variable of the machine-learned model, wherein the first variable defines a relation between a radial distortion of the image and a focal length of the image; and
outputting the intrinsic parameter of the image.

10. The computer program product of claim 9, wherein the relation defined by the first variable is proportional to the radial distortion and inversely proportional to a square of the focal length.

11. The computer program product of claim 9, wherein the machine-learned model is configured to use a pre-set relation between a first radial distortion parameter and a second radial distortion parameter.

12. The computer program product of claim 9, wherein the machine-learned model being configured to predict at least an intrinsic parameter of the image comprises the machine-learned model being configured to predict a field of view of the image.

13. A system for analysis of an image, comprising:
a processor configured to:
receive the image to be analyzed;
process the image with a machine-learned model, wherein the machine-learned model is configured to predict at least an intrinsic parameter of the image using at least a first variable of the machine-learned model, wherein the first variable defines a relation between a radial distortion of the image and a focal length of the image; and
output the intrinsic parameter of the image; and
a memory coupled to the processor and configured to provide the processor with instructions.

14. The system of claim 13, wherein the relation defined by the first variable is proportional to the radial distortion and inversely proportional to a square of the focal length.

15. The system of claim 13, wherein the first variable is defined as:

$$\widehat{k_1} = \frac{k_1}{f^2}$$

wherein $\widehat{k_1}$ is the first variable, $k_1$ is a radial distortion parameter of the image and f is the focal length of the image.

16. The system of claim 13, wherein the machine-learned model is configured to use a pre-set relation between a first radial distortion parameter and a second radial distortion parameter.

17. The system of claim 16, wherein the machine-learned model is further configured to predict an uncertainty of the intrinsic parameter and the method further comprises outputting the uncertainty.

18. The system of claim 13, wherein the machine-learned model being configured to predict at least an intrinsic parameter of the image comprises the machine-learned model being configured to predict a field of view of the image.

19. The system of claim 18, wherein the machine-learned model is further configured to predict at least an extrinsic parameter of a camera using which the received image has been acquired.

20. The system of claim 13, wherein the processor is further configured to correct coordinates of feature points in the image based on the outputted intrinsic parameter.

* * * * *